United States Patent [19]

Hessenmuller et al.

[11] 3,862,369

[45] Jan. 21, 1975

[54] METHOD OF AND APPARATUS FOR TRANSFERRING ASYNCHRONOUS INFORMATION IN A SYNCHRONOUS SERIAL TIME MULTIPLEX

[75] Inventors: Horst Hessenmuller; Willy Bartel, both of Darmstadt, Germany

[73] Assignee: Siemens Aktiengesellschaft, Berlin and Munich, Germany

[22] Filed: July 5, 1972

[21] Appl. No.: 269,029

[30] Foreign Application Priority Data

July 8, 1971 Germany.......................... 2133995

[52] U.S. Cl............................. 179/15 BA, 178/2 E

[51] Int. Cl............................................. H04j 3/06

[58] Field of Search........................340/413, 172.5; 179/7 R, 8 A, 15 BA, 15 BV, 18 FF; 178/2 E

[56] References Cited

UNITED STATES PATENTS

| | | | |
|---|---|---|---|
| 3,244,811 | 4/1966 | Vogel | 179/7 R |
| 3,334,183 | 8/1967 | Swift | 179/15 BA |

FOREIGN PATENTS OR APPLICATIONS

| | | | |
|---|---|---|---|
| 1,929,835 | 6/1969 | Germany | 179/15 BA |

*Primary Examiner*—William C. Cooper
*Assistant Examiner*—Thomas D'Amico
*Attorney, Agent, or Firm*—Schuyler, Birch, Swindler, Mckie & Beckett

[57] ABSTRACT

A method and apparatus for transferring asynchronous data signals in a synchronous time sequence are described. Such a transfer operation has particular application in the programmable computer which controls the switching processes in a telecommunication exchange installation. The transferred data may be a sequence of line addresses, in parallel coded, K bit form, of the data signals, i.e., polarity reversals, in the computer, the comptuer being operated in any asynchronous time frame. At the sending station, it is determined at what time interval of a pulse frame $T_o$, subdivided into $2^m$ time intervals, one of N polarity reversals has taken place. This information is then stored in the form of a time address and a line address in parallel coded K bit form, as is a one bit code indicating the direction of the polarity reversal. This information is stored in shift registers which are triggered alternately for writing it in and reading it out in the order of its arrival. The information is then transmitted over a transmission line in serial form. At the receiving station, the serial data is converted into asynchronous, parallel data using the timing frequency of the computer, allowance being made for the tine address.

4 Claims, 4 Drawing Figures

METHOD OF AND APPARATUS FOR TRANSFERRING ASYNCHRONOUS INFORMATION IN A SYNCHRONOUS SERIAL TIME MULTIPLEX

BACKGROUND OF THE INVENTION

This invention relates to a method of and apparatus for transferring asynchronous information signals in a synchronous time frame. Particularly, the invention has application in the transmission of a sequence of line addresses parallel-coded in K bit form of the polarity reversals of a telecommunication switching installation computer operated in an asynchronous time frame.

This type of asychronous sequence of polarity reversals or data characters occur in electronic data switching installations wherein a signal is only transmitted from the transmitting line to the receiving line via a switching computer, when a potential change has taken place on the sending line. During this process, the line address of the sending line and the direction of the potential change are binary coded.

As is known, (see West German Patent Application No. 1929835), in order to prevent the conversion of the asynchronous time multiple of the exchange heretofore necessary into a frequency multiple on the transmission path via a spatial multiple, the coding of the lines driven with a polarity reversal and employed in the exchange computer shall, as far as possible, also be maintained on the transmission path by dividing the coding into:

a. a higher-valued portion which identifies the geographical direction of the line and which is decoded and allocated to the line concerned of a spatial multiple dividing the directions, and b. a lower-valued portion which identifies the line numbers of the same direction and which is transferred in coded form to the switching computer disposed in the aforesaid direction.

In this connection, both a parallel and a serial transfer of the portion maintained in coded form fall within the scope of this invention.

In the case of the serial transfer, here contemplated, the following must be considered:

As is well known, all imaginable switching functions cannot operate completely asychronously with respect to the data speed. Rather, a fine time frame of, for example, $1\mu$ second must always exist within the exchange. That means, however, that on the incoming K lines, polarity reversals can be indicated at a minimum distance of $1\mu$ second. If the polarity reversals arriving on K lines are converted into a serial time sequence which is K times faster, then within this period 1 start signal +1 polarity direction signal +1 polarity direction signal + K signal for identifying the line number +1 stop signal, i.e., 3 + K signals, must be transmitted. If one considers the fact that a polarity reversal does not take place at every instant of the 1 $\mu$ second sequence, but that within an interval $T_0$ only N polarity reversals can appear, then the resulting necessary transmission speed is much too high, and thus, uneconomical. The synchronous transmission system would be fully utilized for a time, but would not be employed the rest of the time.

It is an object of this invention to arrange at the transmitter an asynchronous sequence of data parallel-coded in K bit into a time-serial sequence to be transmitted synchronously. In particular, the parallel data may be line addresses of polarity reversals of an exchange installation computer operated asychronously. Further, such a process must be able to carry out the reconversion of the now serial data on the receiving end in a manner such that the channel capacity (bits per second) of the serial time frame employed on the transmission path is utilized to optimum advantage.

SUMMARY OF THE INVENTION

The solution to the problem provided by the invention comprises determining first on the sending end at what time interval of a pulse frame $T_0$, which pulse frame is divided into $2^m$ time intervals, one of N polarity reversals has taken place. In this case $T_0$ is measured such that during its course not more than N polarity reversals can appear. Then, this information, together with the line address, parallel-coded in K bit form, and the direction of the polarity reversal, coded in 1 bit form, are stored in the form of a time address in one of two storage units which are triggered alternately for reading in the information and reading it out in the order of its arrival and transmitting it as serial information to the synchronous time line. At the receiver, the serial data are again converted into an asychronous sequence of line addresses consisting of K bit and 1 bit polarity reversal characters by means of frequency signals of the receiver switching computer whereby the time address is taken into account.

The result is that within prescribed limits a maximum number of pulse phases of a pulse frame are occupied by the asychronous data signals, and in this way the transmission capacity can be employed to optimum advantage. Even if at the end of a time interval the polarity reversals accumulate, they can be recovered by switching over to other storage units and by adding the time address on the receiving end in the unfavorable accumulation in time.

BRIEF DESCRIPTION OF THE DRAWINGS

The principles of the invention will be best understood from the descriptions, given hereinbelow, of a preferred means for carrying out the principles of the invention along with the drawings wherein.

DETAILED DESCRIPTION OF THE DRAWINGS

Figure 1:
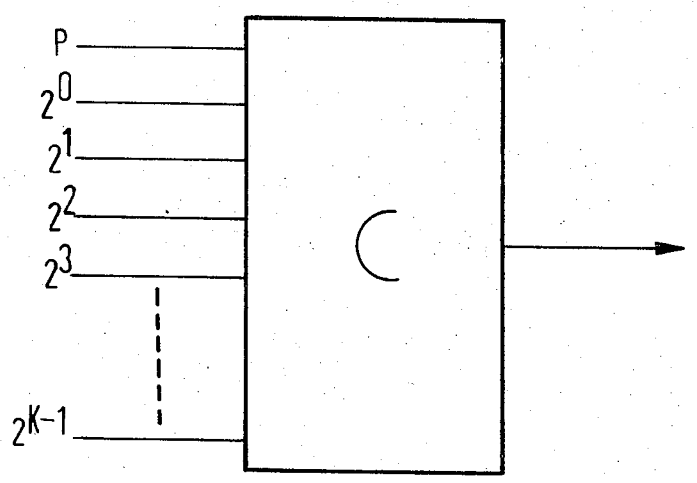
FIG. 1 is a diagram illustrating the coding principles at the transmitter.

FIG. 1 shows schematically a coding apparatus C, to which are connected at the input K+1 lines coming from an asychronous time frame telecommunication switching installation. The lines $2^0$ to $2^K$—1 indicate in binary code form the line addresses on which the polarity reversals take place, and the line P identifies the direction of the polarity reversals. The output of the coder C supplies a stream of information in a synchronous time sequence (*Zvf*). The construction of coder C is described in greater detail hereinbelow.

Figure 2:
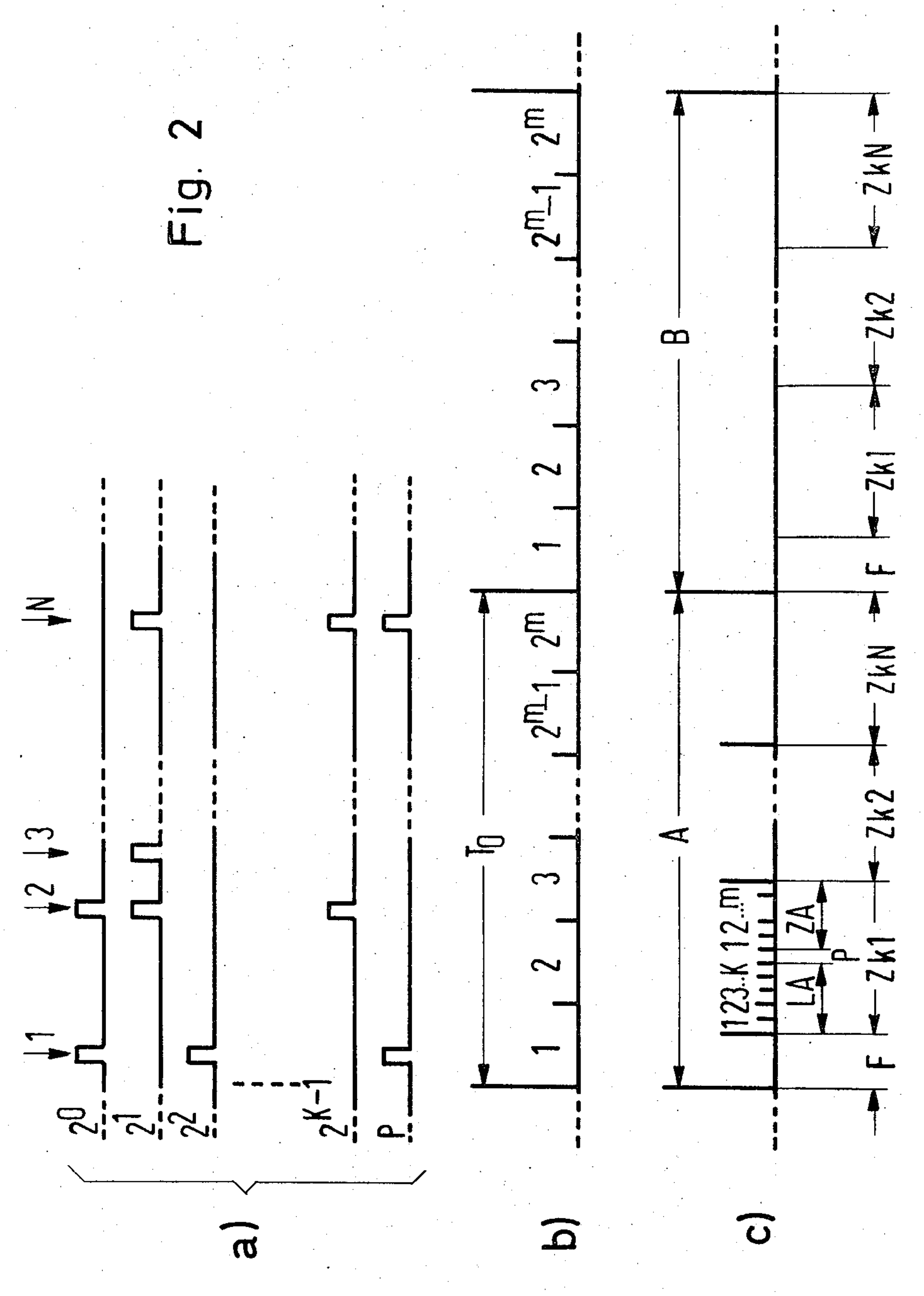
FIG. 2 is constituted by a series of pulse diagrams illustrating operations occurring at the transmitter.

FIG. 2 illustrates the time sequence of the coding procedure. Part *a* of FIG. 2 shows a general example of N possible polarity reversals on the lines $2^0$ to $2^K$—1, as well as on the line P within the time frame $T_o$ shown in line *b*. The time frame $T_o$ is divided into $2^m$ intervals.

By means of the coder C it is determined at what frame interval each individual polarity reversal appears. The interval number corresponding to each polarity reversal, the number of the source causing same and the statement of the line P concerning the direction are immediately transferred to a storage unit, for example, to the individual stages of a shift register. K storage locations for the number of the source, *m* locations for the number of the time interval, and 1 location for the polarity must be available to each polarity reversal. If N polarity reversals appear within $T_o$, then $N(1+m+K)$ storage locations in all are required.

In the next frame $T_o$ the storages are read out serially. During this process, the incoming data signals are written into a second storage combination, and so on. the serial outputs of both storages are connected to a time multiple line. A synchronous pulse current is transmitted over this line. This pulse current is divided into frames having the duration $T_o$. Each frame starts with a code word F, which is requird for the frame synchronizations needed in the receiver (FIG. 2, line c). The code word F is followed by N time channels ZK 1 to ZK N (corresponding to N possible polarity reversals within $T_o$). These time channels, in turn, comprise the line address LA having K binary coding elements (for identifying the source causing the corresponding polarity reversal), the polarity bit P and the time address ZA having m coding elements (for identifying the time interval). The bit rate on the transmission line is then obtained as follows:

$$\phi = F + N(K+1+m)/T_o$$

Figure 3:
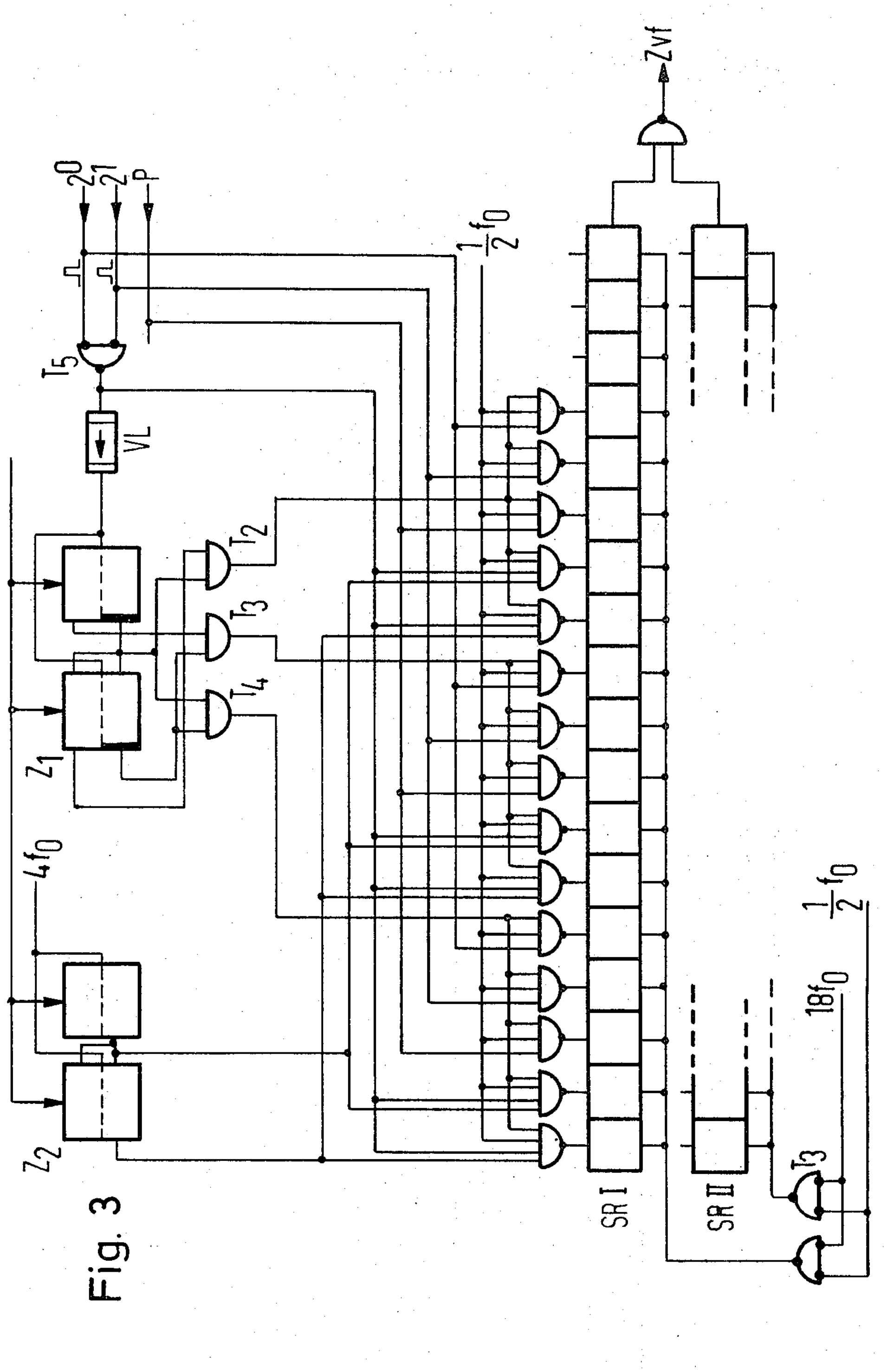
FIG. 3 is a schematic diagram of a preferred embodiment of a circuit for carrying out the invention at the sending station and FIG. 4 is a schematic diagram of a circuit for carrying out the invention at the receiving station.

FIG. 3 illustrates a preferred embodiment of a circuit for a coder C having the parameters $N=3$ time channels, $F=3$ bits, $K=2$ bits and $m=2$ bits. In FIG. 3, SR I represnts a shift register prepared for a specified frame duration $T_o$ for writing in the time and line addresses of conversion frequencies $1/2\ f_o$, and SR II the shift register used for read-out purposes. Timing pulses $18/T_o$ are coupled to shift registers SR I and SR II, respectively, over gates $T_1$ and $T_3$.

For clearer identification, only the two ends of SR II are shown, the center portion being indicated in broken line.

From an event counter $Z_1$, which is a conventional binary counter and which records all polarity reversals coming from the switching installation computer, and which is brought to a predetermined position at the start of a new time interval $T_o$, one of the storage locations consisting of N=3 from $(K+1+m) = 5$ stages is opened via one of the gates $T_2$ . . . . $T_4$.

A second coungter $Z_2$, also a conventional binary counter, is advanced synchronously with $2^m = 4$ times the timing frequency of a frame interval $T_o$ and transmits, via $m=2$ gates, the instantaneous time interval applicable with respect to the start of the frame parallel to all $N=3$ storages to the storage locations provided for accepting the time address (ZA).

A synchronization pattern F is written into the first storage locations lying directly ahead of the serial output SR I after each triggering of the parallel inputs by signal $1/2\ f_o$.

If a data character on the $(K+1) = 3$ lines is made available to the coder by the exchange or switching installation computer, then this character is sent in a parallel mode to the first of $N=3$ storages, whereby the instantaneous counter position of Z2 is written into the corresponding m=2 storage locations via gate $T_5$.

Furthermore, the event counter is advanced by one location, via gate $T_5$, with a delay VL exceeding at least the duration of the polarity reversal data character, so that the next storage having $N=3$ storage elements is prepared for the acceptance of the next information. The two shift registers SR I and SR II are switched by means of signal $1/2\ f_o$ alternately for the acceptance of new parallel data or for the transmission of serial data.

Figure 4:
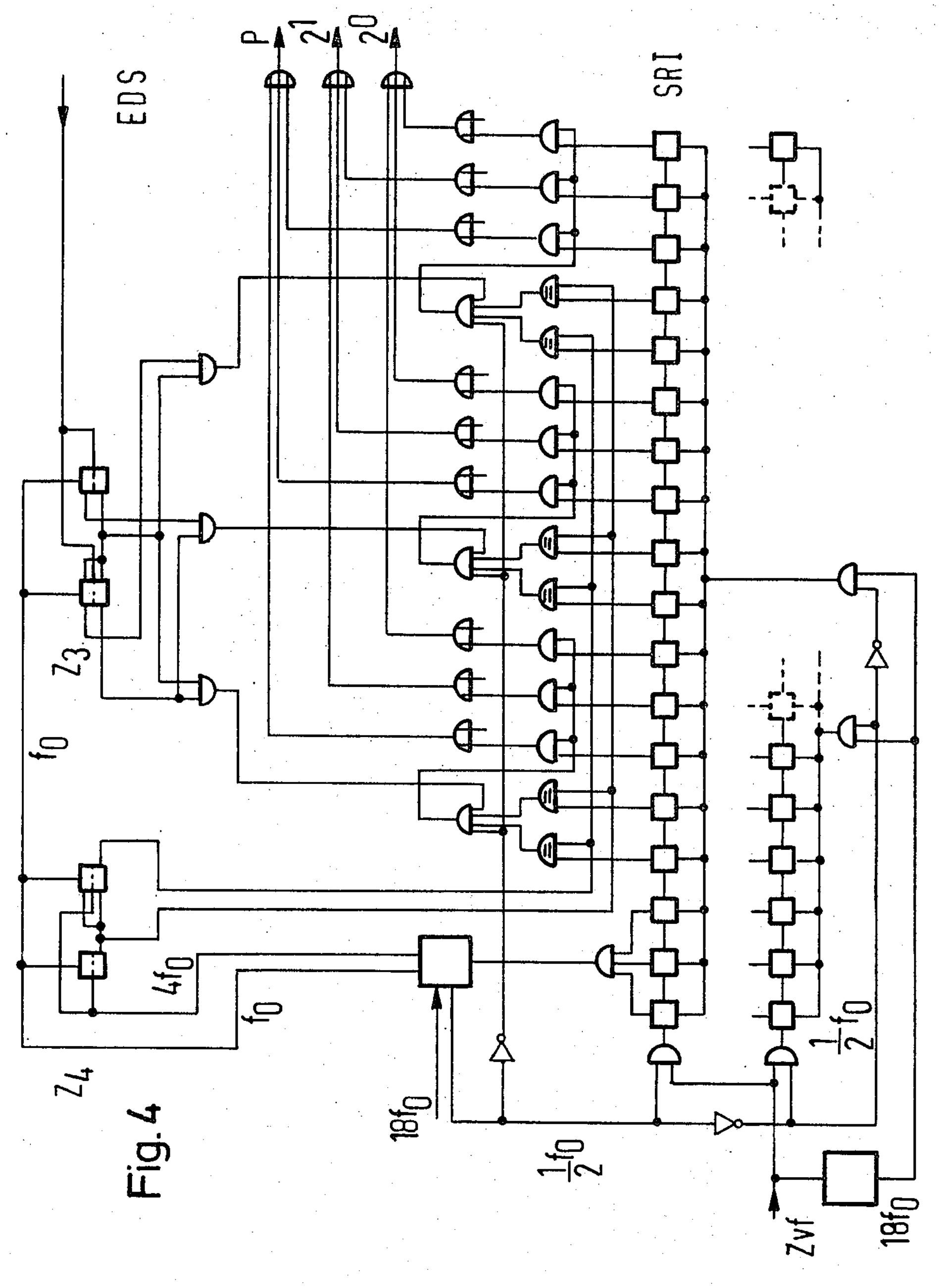

The basic construction for decoding, at the receiving station, of asynchronous polarity reversals or data characters coded in the sender is shown in FIG. 4, for the example $N=3$ time channels, $F=3$ bits synchronous words, $K=2$ bit line addresses and $m=2$ bit time addresses. The reverse of what occurs in the coder of FIG. 3 takes place in the receiver in that for the conversion of the data, two shift registers SR I and SR II are alternately written into a serial mode and read out in a parallel mode for a cycle duration $T_o$. The frequency $1/2\ f_o$ which alternately permits the transfer of the serial data to the register or opens the output gates for the delivery of the parallel data from the registers, are recovered in a synchronization unit from the synchronous word F (FIG. 2*c*). In addition, the counting pulses $4\ f_o$ for the time interval counter and the reset frequency $f_o$ for the time interval counter and the event counter are similarly rcovered. Counter $Z_3$ is advanced by the interval frequency of the switching computer and prepares one of N gates at a time. Each gate N transmits a pulse when the coded time address corresponds with the position of the time interval counter at the output. In this way, whenever two time addresses, which correspond to different polarity reversals, are in agreement, the line addresses and the corresponding polarity reversal characters can reach the switching computer one after the other.

In FIG. 4 (as in FIG. 3), only one shift register SR I is shown with the necessary equivalent gates for the evaluation of the time address and the necessary gate circuits for reading out the data originating in the switching computer (polarity reversal character and line address), while the second shift register is only briefly indicated and the gates connected thereto have been omitted. The time interval data and preparatory data required for the evaluation are derived from the time interval counter and the clock counters $Z_4$ or $Z_3$ described hereinabove, which are similarly constructed as the time interval counter $Z_2$ and the event counter $Z_1$.

The description given hereinabove of a preferred embodiment constructed according to the principles of the invention is only exemplary. It is contemplated that changes to or modifications in the described embodiment may be made within the spirit and scope of the invention as defined by the appended claims.

We claim:

1. In a telecommunication switching system a method for transferring asychronous information in synchronous serial form wherein the asynchronous information comprises polarity reversals occurring on parallel lines and wherein line addresses of the polarity reversals are in parallel coded form and have a number of bits equal to K, comprising the steps of:

determining, at the sending station for said asynchronous information, a time address in which of a number $2^m$ time intervals forming a pulse frame $T_0$ one of N of said polarity reversals has occurred, said frame $T_0$ having a duration equal to N groups of data of N polarity reversals in serial form plus a synchronous word F, each said group of data consisting of said time address comprising the time interval in said frame when said one polarity reversal occurred, said line address and information as to the polar direction of said one polarity reversal, storing the parallel coded time address result of said determining step in shift register means, triggering said shift register means for writing in said parallel coded time address information and reading it out in the order of its arrival forming a synchronous serial information signal, transmitting said serial information signal to a receiver station and converting said serial information signal into a parallel coded informatin signal having K bits in dependence on said time address and utilizing timing signals used for operating data processing apparatus at the receiving station.

2. In apparatus for transferring asynchronous information in synchronous serial form, said apparatus including a sending station connected to incoming parallel lines and a receiving station connected to said sending station by a transmission medium, wherein said asychronous information consists of polarity reversals occurring on said parallel lines, wherein the line addresses of said polarity are in parallel coded form having at least a number K of bits, said sending station comprising:

event counter means for registering each polarity reversal, second counter means for generating a time address in parallel coded form for said polarity reversals, said second counter means being advanced synchronously with each of the $2^m$ time intervals constituting a pulse frame $T_o$, each of said pulse frame having a duration equal to N groups of data of N polarity reversals in serial form plus a synchronizing word F, each of said groups of data consisting of said line address, the time address in said frame when said one polarity reversal occurred and one bit of information as to the one polarity reversal, shift register means for receiving said pulse frame data groups in parallel form and for producing a serial output therefrom, and N groups of gate means for connecting the lines on which the polarity reversals and the associated line addresses are received to said shift register means and for connecting said second counter means to said shift register means at predetermined times said shift register means thereby receiving and storing said groups of data of N polarity reversals at predetermined times through said gate means as determined by event counter means.

3. The method defined in claim 1 wherein said shift register means is constituted by two shift registers, said shift registers being triggered alternately for writing said parallel coded information and reading it out, each said shift register having at least $N\ (1{+}m{+}K)$ storage locations plus at least a location for the synchronizing word.

4. The apparatus defined in claim 2 wherein said receiving station comprises:

third counter means advanced in synchronism with the timing frequency in data processing apparatus in said receiving station, shift register means for receiving serial information at its inputs and producing parallel coded information at its outputs, a plurality of further gate means connecting said third counter means to said shift register means for preparing successively the outputs of a like plurality of storage locations in said shift register means, and fourth counter means which is advanced with the time intervals constituting a pulse frame.

* * * * *